United States Patent [19]
Jang et al.

[11] Patent Number: 5,892,840
[45] Date of Patent: Apr. 6, 1999

[54] METHOD AND APPARATUS FOR IRRADIATION FIELD DETECTION IN DIGITAL RADIOGRAPHIC IMAGES

[75] Inventors: Ben K. Jang; Thomas R. Mergler, both of Rochester, N.Y.

[73] Assignee: Eastman Kodak Company, Rochester, N.Y.

[21] Appl. No.: 608,834

[22] Filed: Feb. 29, 1996

[51] Int. Cl.⁶ ........................................ G06K 9/46
[52] U.S. Cl. ..................... 382/132; 382/283; 378/162
[58] Field of Search ................... 382/128, 132, 382/90, 195, 151, 282–283; 378/150, 152, 162, 205, 206, 163–165, 153–155

[56] References Cited

U.S. PATENT DOCUMENTS

| | | | |
|---|---|---|---|
| 3,909,616 | 9/1975 | Redfield et al. | 378/163 |
| 4,731,863 | 3/1988 | Sezan et al. | 382/51 |
| 4,804,884 | 2/1989 | Nakajima | 250/327.2 |
| 4,829,181 | 5/1989 | Shimura | 250/327.2 |
| 4,851,678 | 7/1989 | Adachi et al. | 250/327.2 |
| 4,859,850 | 8/1989 | Funahashi | 250/327.2 |
| 4,860,330 | 8/1989 | Strommer et al. | 378/162 |
| 4,952,805 | 8/1990 | Tanaka | 250/327.2 |
| 4,962,539 | 10/1990 | Takeo et al. | 382/9 |
| 4,967,079 | 10/1990 | Shimura | 250/327.2 |
| 5,008,947 | 4/1991 | Yamada | 382/132 |
| 5,028,782 | 7/1991 | Nakajima | 250/327.2 |
| 5,268,967 | 12/1993 | Jang et al. | 382/6 |
| 5,506,913 | 4/1996 | Ibison et al. | 382/132 |
| 5,533,089 | 7/1996 | Mulhern | 378/150 |
| 5,644,649 | 7/1997 | Schoeters et al. | 382/132 |

FOREIGN PATENT DOCUMENTS 0 288 042  4/1988  European Pat. Off. ......... H04N 5/20

OTHER PUBLICATIONS

"Pattern Spectrum and Multiscale Shape Representation" by Petros Maragos. IEEE Transactions on Pattern Analysis and Machine Intelligence, vol. II, No. 7, Jul. 1989, pp. 701–716.

*Primary Examiner*—Amelia Au
*Assistant Examiner*—Larry J. Prikockis
*Attorney, Agent, or Firm*—William F. Novel

[57] ABSTRACT

An automated method and apparatus are disclosed for detecting the irradiation field of a radiographic image, wherein digital image data is acquired and subjected to multiple phases of digital imaging processes. The image is first acquired by a radiation image recording apparatus through a landmark-synthesizing device that generates landmark patterns on the acquired image. These patterns are indicative of where the irradiation field is located, and are subsequently detected by digital image processing techniques. Next, the irradiation field is robustly and efficiently identified through these landmark patterns. An irradiation map is then created that functions as a template for any further image processing to be done on the irradiation field. Once the irradiation field is identified, the landmark patterns are removed from the acquired image using digital image processing techniques if desired. Finally, a mask image is generated to reduce the flare effect of the output image in areas that have received very little radiation, making the output image both diagnostically useful and aesthetically pleasing.

27 Claims, 5 Drawing Sheets

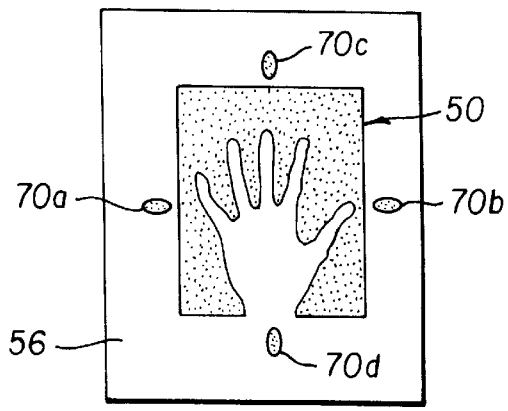
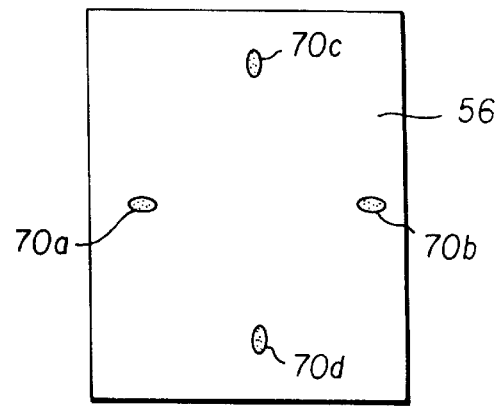
FIG. 8(a)　　　　　FIG. 8(b)
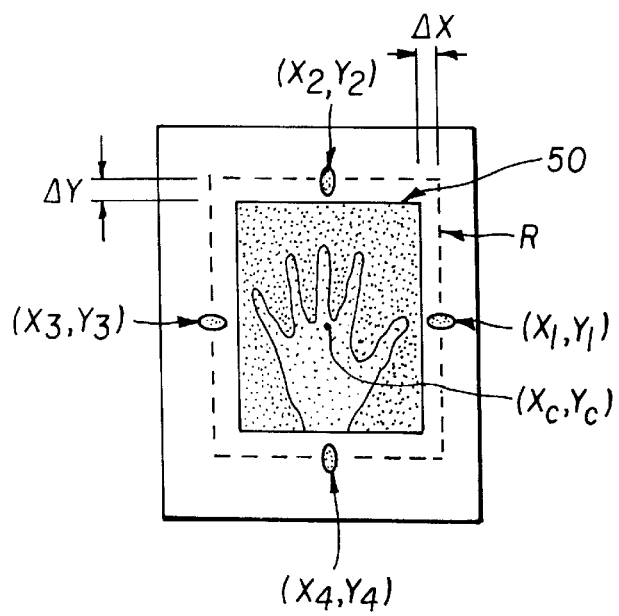
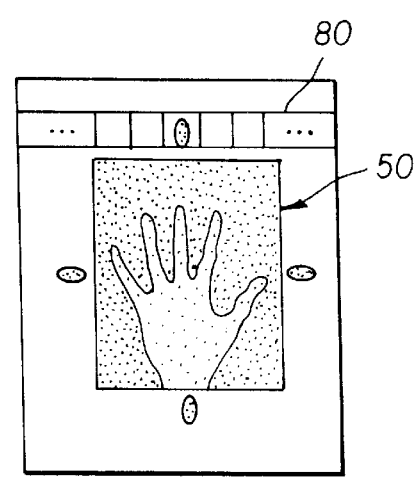
FIG. 9　　　　　FIG. 10(a)
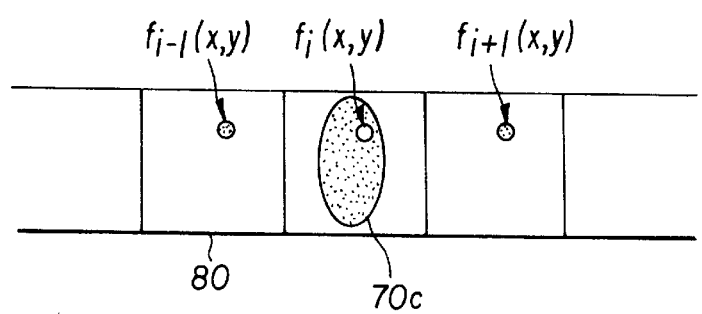
FIG. 10(b)

METHOD AND APPARATUS FOR IRRADIATION FIELD DETECTION IN DIGITAL RADIOGRAPHIC IMAGES

FIELD OF THE INVENTION

The present invention relates in general to digital image processing for medical systems, and, more particularly, to an automated method and apparatus for detecting the irradiation field of a digital radiographic image for various applications related to diagnostic imaging.

BACKGROUND OF THE INVENTION

In traditional (analog) screen/film radiography, the film functions both as a recording medium, converting light from the screen into a latent image that is rendered visible after chemical processing, and as a display medium on a viewbox. Therefore, the characteristic curve of the screen/film system largely determines the contrast with which small and low-contrast details are displayed in the output image (film). In order to provide the best output image, the radiographer must try to control the amount of scatter radiation reaching the film. The principal factors that affect the amount of scatter produced are the kilovoltage applied to the radiation generator and the irradiated material (e.g., tissue). As kilovoltage increases, the percentage of primary photons that will undergo scattering also increases. As the volume of irradiated tissue increases, the amount of scatter produced is increased. Volume will increase as the irradiation field size increases or as the patient thickness increases. The atomic number of the irradiated material also has an impact on the amount of scatter produced. Higher atomic number materials have a greater number of electrons within each atom, and therefore photons have a greater chance of interacting with these materials.

To control the amount of scatter and reduce patient dose, one of the most common methods is the use of some beam-restricting devices such as aperture diaphragms, cones/cylinders and collimators. Of them, the collimator is the most commonly employed beam restrictor in radiography because it permits an infinite number of field sizes using only one device. It also has the advantage of providing a light source for the radiographer as an aid in properly placing the x-ray source tube. Accurate collimation of the x-ray beam to the region of interest reduces the area and volume of tissue irradiated and provides for a reduced amount of scatter reaching the film, resulting in better image contrast.

In digital radiography, on the other hand, storage phosphors are used for the digital acquisition of projection radiography. These phosphors offer a very wide exposure latitude ($10^4$:1) compared with that (40:1) of the traditional screen/film radiography. Because of this wide range of detectable exposures, the necessity of re-exposing a patient due to improper selection of exposure factors is virtually eliminated. Moreover, the separation of image acquisition and display stages provides opportunities for the electronic processing, storage, and transmission of radiographic images.

In the descriptions that follow, the irradiation field will be used to denote the image area containing the body part and the direct x-ray exposed region which has received unattenuated x-rays. The non-irradiation field will be used to denote the very low intensity area, wherein a highly absorbent beam restrictor is used to "frame" the irradiation field in the acquired image.

Although image processing techniques are allowed to be applied in digital radiography, the effectiveness of such techniques depends on the careful choice of the various parameters that control their performance. For example, histogram-based tone-scale transformation is a simple and effective way of adjusting the contrast of an image. However, the histogram is a global characteristic of the image, and therefore does not distinguish between the anatomically important regions of the image (e.g., the body part) and the unimportant regions of the image (e.g., the non-irradiation field). Thus, a tone-scale transformation based on such a histogram will be suboptimum if it is unduly influenced by the unimportant regions of the image.

Due to the importance of the information from the irradiation field, a variety of prior art methods have been proposed to detect the irradiation field of a radiographic image. For example, U.S. Pat. No. 4,731,863 teaches a technique for finding gray level thresholds between anatomical structures and image regions based on zero-crossings of a peak detection function derived from application of smoothing and differencing operators to the image histogram. This method produces a series of peaks by analyzing the histogram at several different signal resolutions. According to this method, the peaks need to be interpreted for each exam type and exposure technique. That is, for one exam type or exposure technique a low-signal peak could correspond to a non-irradiation field, but for another type or technique it could also correspond to a body part if no non-irradiation field is present in the image. Thus, some additional information may be needed to complete the analysis.

Other methods of histogram analysis have also been proposed. U.S. Pat. No. 4,952,805 teaches an irradiation field finding technique based on dividing the histogram into several sections with an intensity thresholding procedure and then doing a statistical shape analysis (discriminate analysis) of the section believed to correspond to an irradiation field. A decision about the presence of an irradiation field is made based on the shape of this section in the histogram. However, the large variety of histogram shapes that can occur with different exam types and different input modalities (such as magnetic resonance imaging (MRI), computed tomography (CT), ultrasound (US), nuclear medicine, digital subtraction angiography (DSA), and computed radiography (CR)) make this type of analysis subject to error. In addition, since a single threshold is chosen to represent the transition from a non-irradiation field to an irradiation field, this method does not perform well when the transition is fairly wide, such as when x-ray scatter is present.

European Patent Application 288,042, published Oct. 26, 1988, proposes an irradiation field finding method using the image histogram. In this method, the histogram is again divided into a number of sections by an automatic thresholding procedure. Then a statistical analysis (discriminate analysis), combined with information about the exam type, exposure technique, and desired body portion to be displayed, is used to adjust the separation points between the sections until desired ranges for the irradiation field are found. This method is less prone to variations in exam type and input modality because this information is incorporated into the decision process. However, the se of fixed thresholds still poses problems if there is nonuniformity in the non-irradiation field.

A more effective way of detecting the irradiation field of a radiographic image is to include spatial information in the analysis, in addition to the intensity information provided by the histogram. Several methods have been described for doing this. U.S. Pat. Nos. 4,804,842 and 5,028,782 disclose a method for detecting the irradiation field in an image based on calculating derivatives of the input image and then identifying those points whose derivatives are higher than a threshold value identified with edge points. Then a new histogram of the input image is done using only the points identified as edge points, and from this histogram another threshold value is chosen to represent the boundary of the irradiation field. This method is claimed to provide a more accurate measure of the field than a simple histogram method. However, it still requires a priori knowledge that a collimator or field stop was in fact used to define the irradiation field, otherwise low-signal portions of the image inside the body part may be clipped by the intensity thresholding that defines the boundary. Furthermore, if image pixels inside the body part have a signal value comparable to or lower than those in the non-irradiation field (as when there is significant x-ray scatter), the edge of the irradiation field may not even be found with this method. Finally, if the region in the non-irradiation field is nonuniform in intensity, which is frequently the case when there is scatter present, there will not be a strong edge at the boundary of the irradiation field, and the derivative at the edge points may not have a high enough value to pass the threshold, leading to inaccuracies in finding the edge points.

Other irradiation field detection methods have been described that use one dimensional edge detection along arbitrary lines drawn across the image. For example, U.S. Pat. No. 4,967,079 discloses a method for storage phosphor digital radiography systems that uses derivatives along radial lines from the image center, followed by a thresholding operation to detect potential edge points of the irradiation field. The boundary of the field is recognized by testing the colinearity of the found edge points. In order to be effective, this method requires a strong edge transition from the non-irradiation field to the irradiation field. However, the transition can sometimes be very weak and even inverted (body part with a lower signal than foreground, due to scatter). Furthermore, if the image involves multiple smaller images recorded on a large detector (so-called subdivision or multiple exposure recording), there will be many edges detected along radial lines from the image center, possibly leading to the detection of false boundaries.

An alternate approach to irradiation field detection has been disclosed in U.S. Pat. No. 4,859,850. In this case, lines are extended from the edge of the image towards the center and, for each line, the transition regions from low signal to high signal at the edge of an irradiation field are fit with a linear or nonlinear equation. When the differences between the extrapolated fitted values (calculated from the equation) and the actual image values inside the field become too large, or when the extrapolated values reach a threshold signal level, the edge of the field is assumed to have been found. One problem with this method is that it assumes that a non-irradiation field has to be present (i.e., a priori knowledge of the exposure technique is required). A second problem has already been mentioned above, namely, that the method assumes that the signal values inside the irradiation field are always larger than those immediately outside it, which is not always the case when scatter is present. A third problem is that if subdivision recording has been used, the method may not find all of the necessary edges to define each irradiation subfield within the image. Finally, the use of multiple linear or nonlinear fits on multiple lines across the image is an inefficient, time-consuming way to find the irradiation field boundaries.

A possible solution to the previously mentioned problem of detecting edges in subdivision recording has been proposed in U.S. Pat. No. 4,851,678. In this method, designed for storage phosphor digital radiography, potential edge points can still be found using the above method of differentiation along lines, but other possibilities are also disclosed. For example, once a few candidate edge points have been found, a boundary tracking procedure, based on following the likeliest edge points around the boundary from nearest neighbor to nearest neighbor (using a ridge-following algorithm) until they close on themselves again, is used to find the irradiation field. This method purports to handle multiple exposure subfields as well because multiple starting edge points can be followed around their respective irradiation subfields. Since the method of finding prospective edge points is similar to those above, similar potential problems exist, namely, that the method can break down when the edge transition from the irradiation field to the non-irradiation field is weak. Also the ridge-following algorithm can be very sensitive to noise, so the image data must be smoothed before analysis.

As indicated above, the presence of multiple smaller images recorded on a single larger recording medium (i.e., subdivision recording) can create problems in locating all of the irradiation subfields in the image. Sometimes a preprocessing stage can be used to identify the use of subdivision recording and also the format of the image (2-on-1, 4-on-1, etc.). For example, U.S. Pat. No. 4,829,181 teaches a method of recognizing a subdivision pattern in a storage phosphor system using differentiation to detect prospective edge points, followed by a colinearity test to see if the edge points lie on straight lines. If the edge points lie on straight lines, subdivision recording is judged to be present. A limitation of this method is that it can detect only rectilinear patterns, i.e., patterns with essentially horizontal or vertical linear separations.

Another approach to detecting such subdivision patterns is the use of pattern matching. U.S. Pat. No. 4,962,539 discloses a method that uses a set of binary, stored masks representing typical subdivision recording patterns. The input digital image is converted into a binary image by thresholding, and the resulting binary image is statistically compared with each of the masks in the stored set. The stored mask with the highest degree of matching is judged to be the recording pattern on the input image. While this method can handle a wider variety of patterns than the one above, it is still limited to the stored library of patterns for matching. Any irregular patterns not included in the library may not have a high degree of matching, and may therefore be chosen incorrectly. Furthermore, statistical matching is complex and time consuming.

In another prior art method, U.S. Pat. No. 5,268,967 discloses a method that first analyzes the edge content of the image, and then breaks the image into a set of nonoverlapping, contiguous blocks of pixels. The edge density in each block is computed as one indicator of the level of detail or "busyness" in various locations of the image, and, therefore, an indicator of whether these locations are more likely to belong to the irradiation or non-irradiation field.

Further analysis of the image and classification into the various regions take place on a block-by-block basis. Although the reliability of this method is good, in particular for single exposure images, the level of complexity is high and the speed is prohibitive for real-time applications.

Thus a need remains for an automated method and apparatus for digital image processing to perform the detection of an irradiation field and multiple irradiation subfields.

Such a method and apparatus would allow the parameters of subsequent image processing techniques to be calculated more robustly and efficiently, leading to better image quality and more accurate diagnosis.

SUMMARY OF THE INVENTION

An object of the invention is to provide an automated method and apparatus for digital image processing to perform the detection of an irradiation field and multiple irradiation fields.

A further object of the invention is to allow the parameters of subsequent image processing techniques to be calculated more robustly and efficiently, leading to better image quality and more accurate diagnosis.

A further object of the invention is to generate a mask image from a given radiographic image to make the output image both diagnostically useful and more visually pleasing.

According to the preferred embodiment of the present invention as directed to irradiation field detection, the foregoing problems in the prior art are overcome by practice of a method comprising the steps of:

(a) acquiring a landmarked digital image of the object of interest;

(b) detecting a landmark pattern in the acquired image; and (c) generating an irradiation map that identifies the location of the irradiation field in relation to the landmark patterns, said irradiation map functioning as a template for further image processing of the radiographic image.

In addition, the present invention discloses a method that generates a mask image to make the output image both diagnostically useful and aesthetically pleasing.

The technical advantage of the present invention for irradiation field detection is that it overcomes the problems associated with the prior art while, at the same time, performing well:

(a) when there is severe nonuniformity in the non-irradiation field;

(b) without a priori information about the presence of a collimator or about its shape and size;

(c) even if the transition from the non-irradiation field to the irradiation field has a fairly wide intensity range;

(d) for multiple exposure images; and (e) for real-time applications.

Moreover, the present invention does not require the computation of edge points and therefore, being insensitive to noise, does not require an edge-tracking procedure. Furthermore, it provides an automatic and efficient means for reducing flare effect on the output images.

BRIEF DESCRIPTION OF THE DRAWINGS

FIGS. 8(a) and 8(b) are schematic diagrams illustrating the landmark detection step of the present invention.

FIG. 9 is a schematic diagram illustrating the irradiation map generation step of the present invention.

FIGS. 10(a) and 10(b) are schematic diagrams illustrating the landmark removal step of the present invention.

DESCRIPTION OF THE PREFERRED EMBODIMENTS

Figure 1:
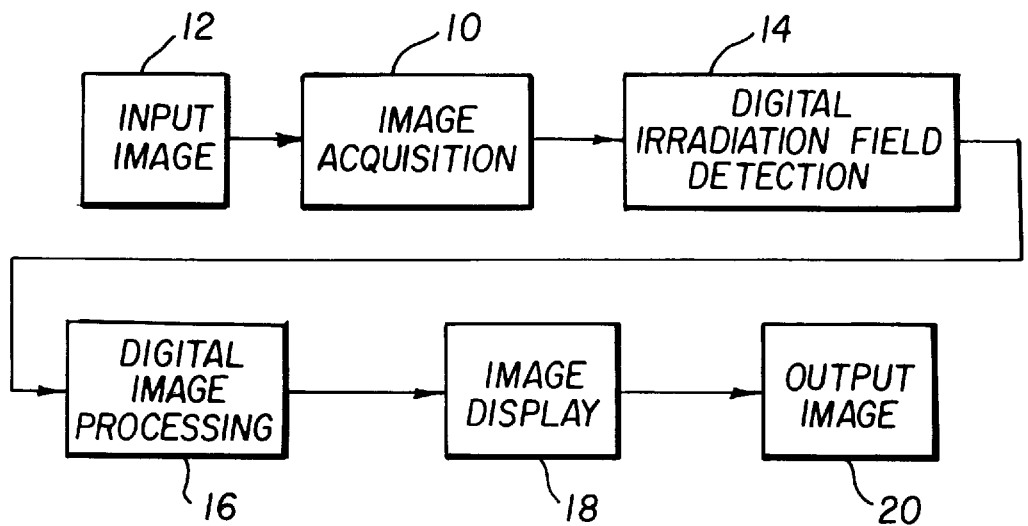
FIG. 1 is a block diagram of an imaging system including the automated method and system of the present invention.

Referring to FIG. 1, there is shown a block diagram of an imaging system including the automated method and system of the present invention. The imaging system comprises an image acquisition device 10 for acquiring an input image 12, a digital irradiation field processor 14, a digital image signal processor 16, and an image display device 18 for producing an output image 20. Although the digital irradiation field processor 14 is illustrated as a separate system, it can reside within the digital image processor 16.

The digital image signals to be processed utilizing the described system can be acquired in a variety of ways. For example, such images are typically derived from storage phosphor (computed radiography) systems, film digitizer systems, image intensifier systems, and the like. Additionally, images acquired via computed tomography (CT) and magnetic resonance imaging (MRI) systems can be utilized. The type of image signal processor 16 utilized in the imaging system will be dependent upon the type of digital image being processed and the ultimate use of the results of said processing. Finally, any number of display devices can be used with the imaging system. For example, the most common display devices are film writers (either laser printers or cathode ray tube (CRT) printers) and CRT soft displays. Additionally, the output image can be captured for permanency on photographic film.

Figure 2:
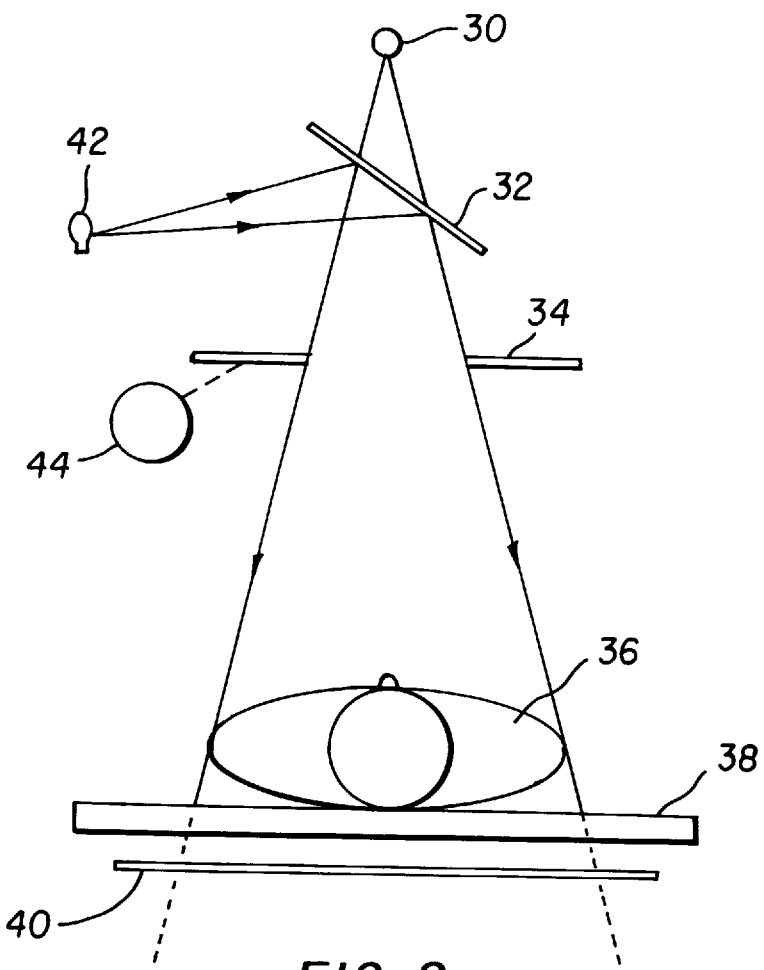
FIG. 2 is a schematic diagram illustrating a radiation image recording apparatus.

A radiation image recording apparatus is illustrated in FIG. 2. The radiation is emitted from an x-ray tube 30 through a beam restrictor, such as a collimator 34, to an object 36 lying an object support 38. The radiation then irradiates a stimulable phosphor plate 40 having a surface composed of excitable phosphors. The collimator 34, which employs movable lead shutters, is the most commonly employed beam restrictor in the image recording apparatus, and it permits an infinite number of field sizes using only one device. The collimator 34 also offers a radiographer a light field which outlines the exposure field and provides a cross hair to identify the center of the x-ray beam. The light field is provided by mounting a mirror 32 supported in the path of the x-ray beam at a 45° angle. A light source 42 is then placed opposite the mirror and the light is projected through the collimator during a set-up procedure prior to capturing the radiographic image. The light source 42 and the x-ray source 30 must be equidistant from one another to ensure that the light field and the x-ray irradiation field are the same size.

When the stimulable phosphor plate 40 is placed and secured in position, sensing devices activate an electric motor 44 which is coupled to the collimator 34 and drives the lead shutters of the collimator 34 into proper position. When operating properly, automatic collimators should leave an unexposed border (non-irradiation field) on all four sides of the exposed phosphor plate 40. However, the field size can also be manually controlled by the radiographer. By so doing, image quality can be improved and patient dose can be minimized.

Figure 3:
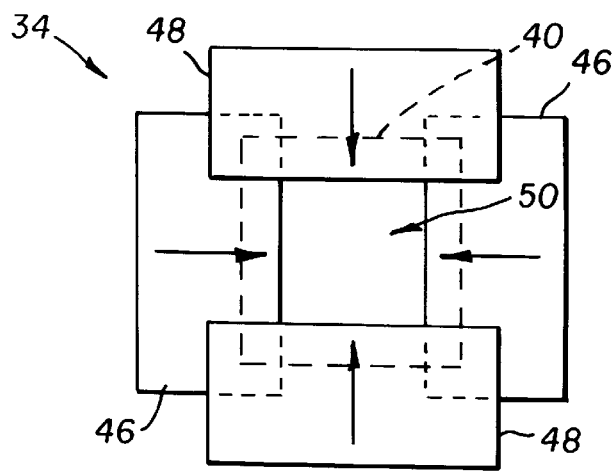
FIG. 3 is a schematic diagram illustrating the top view of the lead shutters of a collimator.

To be useful according to the subsequent description of the present invention, the collimator 34, as shown in FIG. 3, consists of two sets of lead shutters. A set of lower lead shutters 46 are mounted at right angles to a set of upper lead shutters 48, each set moving in opposing pairs as illustrated. Each set moves symmetrically from the center of the irradiation field to define an irradiation field 50 within the area of the plate 40. These lead shutters 46, 48 can be adjusted to correspond to an infinite number of square or rectangular field sizes. The two sets of shutters serve to regulate the field size and, in addition, have two other purposes. The lower shutters 46 reduce penumbra along the periphery of the beam because of their greater distance from the focal spot. The upper shutters 48 help in reducing the amount of off-focus (stem) radiation reaching the film by absorbing this radiation before it exits.

As the radiation energy strikes the surface of the plate 40, a portion of the energy is stored by the phosphors. Upon subsequent stimulation by visible light or other stimuli, the storage phosphors give off light in direct proportion to the amount of energy stored therein. Areas of the phosphors receiving unattenuated radiation absorb the most energy and thus produce the most light when subsequently stimulated. Areas in which lesser amounts of radiation energy are absorbed, due to the presence of the object (e.g., body region), produce a proportionately lesser amount of light when subsequently stimulated.

Figure 4:
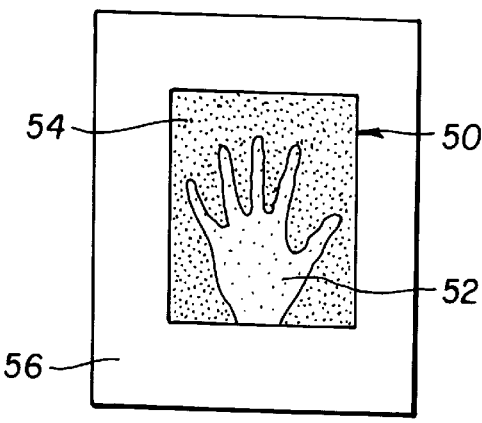
FIG. 4 is a schematic diagram illustrating a digital radiographic image containing an irradiation field and a non-irradiation field, in which the irradiation field is composed of the direct x-ray exposed region and the body part.

FIG. 4 illustrates a digital radiographic image acquired from the radiation image recording apparatus described in FIGS. 2 and 3. The acquired image contains the irradiation field 50 consisting of the body part 52 being imaged and the direct x-ray exposed region 54 (high intensity region), as well as a non-irradiation field 56 (low intensity region).

Figure 5:
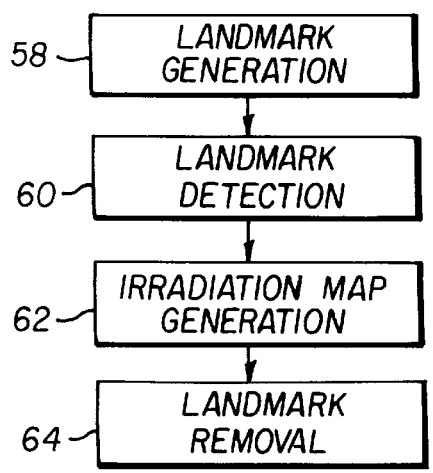
FIG. 5 is a block diagram illustrating the steps of the irradiation field detection method of the present invention.

In general, as shown in FIG. 5, the irradiation field detection method of the present invention includes the following steps: (1) landmark generation 58; (2) landmark detection 60; (3) irradiation map generation 62; and (4) landmark removal 64. For purposes of illustration only, the operation of the present invention will be described with reference to a digital hand radiographic image, as shown in FIG. 4.

Landmark Generation

Figure 6:
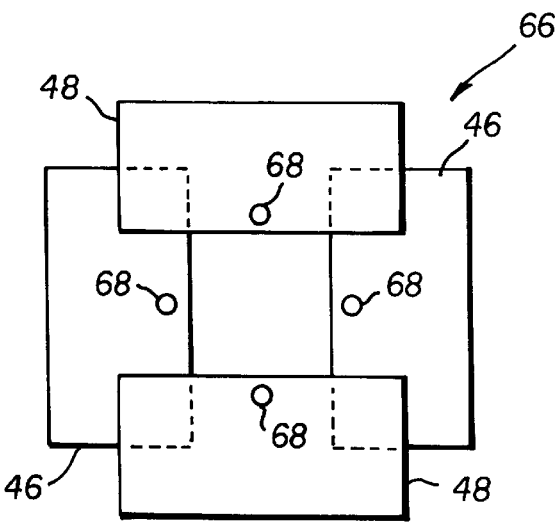
FIG. 6 is a schematic diagram illustrating the top view of a modified collimator in which four small holes are drilled near the edge centers of the lead shutters.
Figure 7:
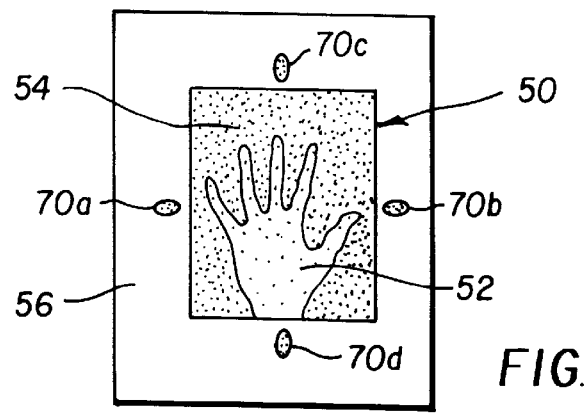
FIG. 7 is a schematic diagram illustrating a digital radiographic image containing four well-aligned landmarks in the non-irradiation region.

The landmark generation step 58 in the disclosed method of the present invention is implemented in the image acquisition device in which the above-described radiation image recording apparatus (FIG. 2) is used to acquire the landmarked image. The device that generates landmark pattern (s) in the acquired image is referred herein as a landmark-synthesizing device (LSD). In the preferred embodiment of the present invention, as shown in FIG. 6, the LSD 66 is simply a modified collimator 66 that has a small circular hole 68 close to the inner edge center of each lead shutter. When the radiation is irradiated through the modified collimator, some photons will pass through the small holes 68 and project onto the stimulable phosphor plate 40. After the phosphor plate 40 is stimulated by visible light or other stimuli, the acquired digital radiographic image, as shown in FIG. 7, contains the irradiation field 50 including the body part 52 being imaged and the direct x-ray exposed region 54 receiving unattenuated x-rays, as well as the non-irradiation field 56 including well-aligned landmark patterns 70a . . . d around the irradiation field. The alignment of these landmark patterns 70a . . . d in the acquired digital image is ensured by the facts that the two sets of lead shutters 46, 48, that are at right angles to one another, move in opposing pairs, and each set moves symmetrically from the center of the irradiation field 50. This implies that detecting two landmark patterns, for example, 70a and 70c or 70d, rendered from any two lead shutters 46 and 48 which are perpendicular to each other, suffices to provide the identification of the other two landmark patterns.

It is important to note that not every landmark pattern has the same intensity value because of the scatter radiation and the possibility that some landmark patterns are rendered through the body part. For example, as shown in FIG. 7, the bottom landmark pattern 70d has a lower intensity value than those of the other three patterns because the radiation is emitted through the wrist. Nevertheless, the intensity values of the pixels in each individual landmark pattern are much more uniformly distributed and greater than those of their surrounding pixels in the nonirradiated field. Therefore, it becomes much easier for subsequent image processing techniques to detect these patterns, which in turn identifies the irradiation field. Moreover, the proportion of the landmark area to the irradiation field area is very small, and hence the potential extra exposure through the modified collimator should not be a problem for diagnostic radiology. If desired, this proportion can be further reduced by adjusting the exposure conditions and the size of the holes in the modified collimator 66.

For example, in one experimental study, a hand phantom was placed on the object support 38 of the radiation image recording apparatus and the modified collimator 66 was provided with a circular hole 68 in each of its lead shutters. The following describes the exposure conditions and the acquired image. The diametric size of the hole 68 and the distance from the hole to the corresponding shutter's edge are 1 mm and 3 mm, respectively. The exposure time, x-ray tube voltage, and current are 1.25 sec, 83 kVp, and 9.4 mAs, respectively. The distance from the x-ray tube 30 to the stimulable phosphor plate 40 is 100 cm, and the distance from the collimator 66 to the stimulable phosphor plate 40 is 72 cm. The irradiation field 50 rendered in the acquired image has a rectangular shape with 267 mm in length and 226 mm in width. Moreover, the landmark patterns 70a . . .d rendered in the acquired image have an elliptic shape with 11 mm in length and 5 mm in width. In terms of digital code values for a 12-bit digital image, the intensity values of the one landmark pattern rendered through the wrist range from 3562 to 3610. The intensity values of the other three landmark patterns range from 4065 to 4095, the maximum code value for a 12-bit digital image. The intensity values of the other pixels in the non-irradiation field range from 274 to 2875. The distance from these landmark patterns to the irradiation field is 7 mm in average. As a result, the proportion of the landmark area to the irradiation field area is approximately $$(\pi \times 11/2 \times 5/2)/(267 \times 226) \approx 0.072\%.$$

Although the LSD illustrated in the landmark generation step of the present invention uses a collimator 66 with four small circular holes 68, it should be noted that any type(s) and/or number of LSD(s) can be designed and utilized where those used provide robust and efficient methods for the irradiation field detection in the subsequent processing. In other words, if a LSD is capable of generating landmark patterns providing the ability of detecting the irradiation field and/or any other anatomically or physically meaningful field of the image, such a LSD can be used, if desired.

It should also be noted that a LSD can be made in such a way that the landmark patterns are activated by some automatic and/or manual control unit(s). For example, when a stimulable phosphor plate is placed in position, a sensing device may activate an electric switch which makes holes appear in the collimator lead shutters. Thus the LSD can be used in a more general fashion for both screen/film radiography and digital radiography.

Once the landmark patterns are rendered in the acquired digital radiographic image, image processing techniques can be applied to identify these patterns, which in turn leads to the detection of the irradiation field.

Landmark Detection

Since the intensity values of the pixels in each individual landmark pattern of the acquired digital image are uniformly distributed and much greater than those of their surrounding pixels, a simple local thresholding technique suffices to detect these patterns. For example, by applying the well-known local thresholding method disclosed in Niblack (W. Niblack, *An Introduction to Digital Image Processing*, pp. 115–116, Englewood Cliffs, N.J.: Prentice Hall, 1986), the acquired digital image shown in FIG. 7 is binarized. The resulting binary image consists of all the landmark patterns plus other possible direct x-ray exposed regions in the irradiation field, as shown in FIG. 8(a). To discriminate between the landmark patterns and the direct x-ray exposed regions, well-known mathematical morphology techniques may be applied (see, e.g., P. Maragos, "Pattern spectrum and multiscale shape representation," *IEEE Trans. Pattern Anal. Mach. Intell.*, vol. PAM-11, pp. 701–716, 1989; and J. Serra, *Image Analysis and Mathematical Morphology*, Academic Press, New York, 1982), which include many efficient algorithms for identifying the landmark patterns by their shapes and sizes. An example is shown in FIG. 8(b) where the landmark patterns are identified using morphological techniques.

Moreover, if the landmark patterns are designed in such a way that different shapes and/or sizes are used for different exam types (e.g., circle for chests and square for elbows), one can again apply morphological techniques to differentiate the desirable landmark patterns from the others, rendering a recognition capability of the disclosed method.

Although the landmark detection step of the present invention illustrated above uses morphological techniques, it should be noted that any other image processing technique(s) can be utilized or developed where those used provide the detection capability of the landmark patterns in the acquired digital image.

Irradiation Map Generation

Once the landmark patterns are detected, the irradiation field can be easily identified in many ways. For example, as shown in FIG. 9, let $(x_i, y_i)$ $(1 \leq i \leq 4)$ denote the center coordinates of the four well-aligned landmark patterns. The center of the irradiation field $(x_c, y_c)$ is thus obtained by $x_c = x_2$ and $y_c = y_1$ because of $x_2 = x_4$, $y_1 = y_3$, and each set of lead shutters moving symmetrically from the center of the irradiation field. A rectangular region R centered at $(x_c, y_c)$ with its boundary passing through $(x_i, y_i)$, $(1 \leq i \leq 4)$ is defined and shown by the dashed lines in FIG. 9. The region R is normally larger than that of the irradiation field, therefore, one can shrink the region R down by the amount $2 \Delta x$ in width and the amount $2 \Delta y$ in height to obtain the true irradiation field. The values $\Delta x$ and $\Delta y$, depending on the exposure conditions, are determined in advance by experiments.

Figure 12A:
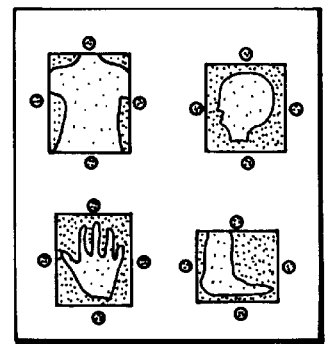
FIGS. 12(a)–(d) are schematic diagrams illustrating the detection of a plurality of irradiation subfields on a single image.
Figure 12B:
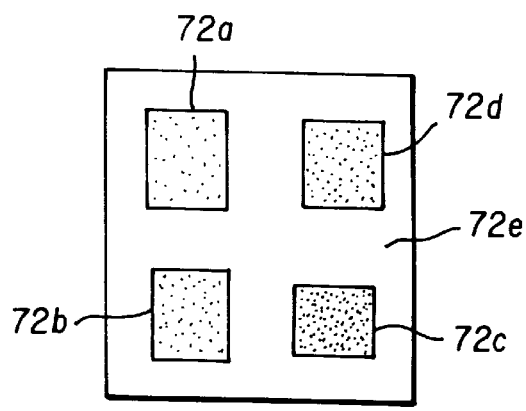
Figure 12C:
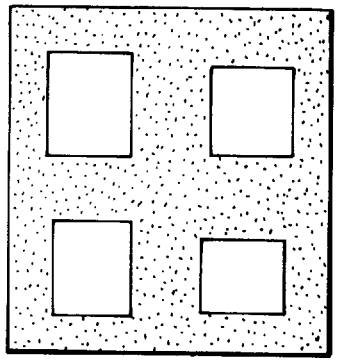

Subsequently, a two-valued (binary) irradiation map that functions as a template for any further image processing to be done on the irradiation field is created. In general, if N multiple exposure images are detected, a (N+1)-valued irradiation map is created for any further image processing to be done on the N irradiation subfields of the image. FIG. 12(b) illustrates an example where the four irradiation subfields $72a \ldots d$ and the one non-irradiation field $72e$ are detected and represented by five different intensity values $i_1 \ldots i_5$, respectively. As a result, if a histogram of the desired exam type is required, only those pixels with the correct value in the (N+1)-valued irradiation field are included in the calculation. If edge enhancement is being performed, pixels in the undesired regions (e.g., the non-irradiation field $72e$ and non-desired subfields) are not included in the calculation of enhancement parameters. In this way, only the relevant information in the image is included in subsequent image processing of the image, leading to images with high quality and high diagnostic utility.

Although the detection of the irradiation field illustrated in the irradiation map generation step of the present invention uses a cue from the generated landmark patterns, it should be noted that many other cues and/or methods can be developed and utilized where those used identify the accurate irradiation field in the acquired image.

Landmark Removal

If desired, the landmark patterns can be removed from the acquired image once the irradiation field has been identified in the disclosed method of the present invention. For example, as shown in FIG. 10(a), the digital image contains a sequence of N horizontal, non-overlapping blocks 80 where the top landmark pattern is enclosed in the ith block. As shown in the enlarged portion in FIG. 10(b), the landmark pattern 70c in the block image $f_i(x,y)$ is then smoothed out by taking the intensity average between its neighboring block images, $f_{i-1}(x,y)$ and $f_{i+1}(x,y)$. Subsequently, to avoid possible edge artifacts from one block to another, a simple one-dimensional (1D) averaging operation using 1×5 kernel is applied to the pixels in the block images $f_{i-1}(x,y)$, $f_i(x,y)$ and $f_{i+1}(x,y)$. Another efficient way to remove the landmark pattern is the use of a curve interpolation technique (e.g., cubic spline interpolation) in which the value $f_i(x,y)$ is considered unknown and interpolated by the values $f_1(x,y)$, $f_2(x,y), \ldots, f_{i-1}(x,y), f_{i+1}(x,y), \ldots f_N(x,y)$ extracted from the sequence of block images. By decomposing the acquired digital image into a sequence of vertical, non-overlapping blocks, the left and right landmark patterns can be processed in the similar way.

Although the landmark removal step of the present invention uses simple smoothing operations and/or a curve interpolation technique, it should be noted that any other image processing methods can be developed and utilized where those used remove landmark pattern(s) in the acquired image.

Mask Generation

Today most radiologists interpret the final output images printed on films and displayed on viewboxes. These printed and displayed films should be interpreted under conditions that provide good visibility, comfort, and minimal fatigue. When the films are placed and the light source is on, the light emitting from the viewboxes through the non-irradiation field (i.e., very low intensity areas) of the displayed images produces a fair amount of "flare". However, the contrast sensitivity of the eye (the ability to distinguish small luminance differences) is greatest when the surroundings are of about the same brightness as the area of interest. Therefore, to see detail in radiographic images, it is important to reduce flare to a minimum. Flare can be reduced by using manually-driven masks to cover unused portions of a viewbox or to cover the non-irradiation field in the output images being examined. In the present invention, we disclose an automatic and efficient means to mask out the non-irradiation fields of output digital images such that these images can be interpreted in more pleasant conditions.

Figure 11A:
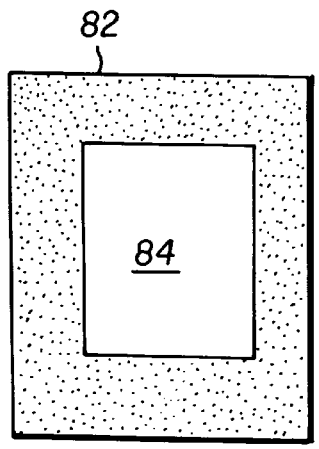
FIGS. 11(a)–(c) are schematic diagrams illustrating the mask generation of the present invention.
Figure 11B:
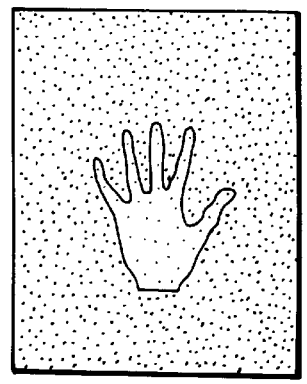

Consequently, another object of the present invention is to automatically generate mask images from which final output images can be made more diagnostically useful and aesthetically pleasing. As shown in FIG. 11(a), a mask image is generated wherein a non-irradiation mask field 82, detected at the previous irradiation map generation step 62 of the disclosed method, is given by a very high intensity value (e.g., 4095), and an open mask field 84 is given a very low intensity value (e.g., 0). If any subsequent image processing performed on the irradiation field is done, the enhanced irradiation field is patched back to the open mask image 84, as shown in FIG. 11(b). Therefore, flare of the output image viewed by radiologists can be reduced to a minimum.

Figure 11C:
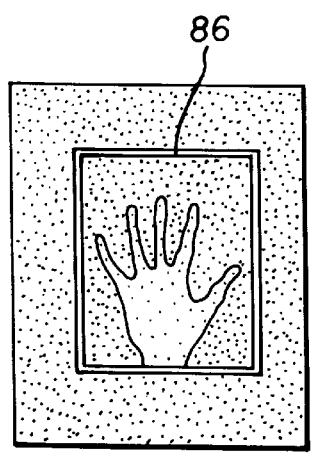
Figure 12D:
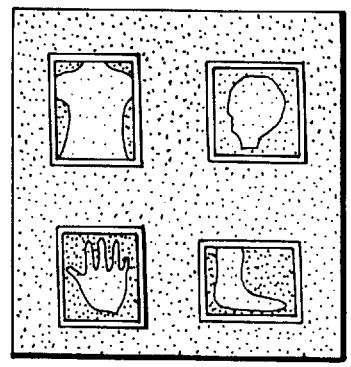

In addition, the intensity values assigned to the pixels in the non-irradiation field may vary according to our particular need. For example, as shown in FIG. 11(c), the pixels composing the "frame" 86 around the irradiation field can be given by an intensity value (say, 2000) different from that of the other pixels in the non-irradiation field. The frame 86 distinguishably separates the non-irradiation field being masked and the direct x-ray exposed regions of the acquired image, making the output image more pleasing. This is more evident when applied to multiple exposure images, as shown in FIG. 12(d).

Although the mask generation of the present invention uses the intermediate results from the irradiation map generation step of the disclosed method in the present invention, it should be noted that the mask generation idea can be utilized and independently applied to any other types of image processing methods which identify the irradiation field and/or regions of interest in the acquired image. Although the non-irradiation mask field is given by a high intensity value in the present invention to reduce the flare effect, it should be noted that any number and types of intensity values and/or image patterns can be utilized and applied to the non-irradiation mask field, according to the specific application(s) at hand. Consequently, the density and texture of the mask may be dependent upon the application.

FIG. 12 illustrates an example where a plurality of irradiation subfields on a single image are detected by the disclosed method of the present invention. FIG. 12(a) shows the acquired digital radiographic image containing four different exam types, each with well-aligned landmark patterns around its irradiation subfield. The four irradiation subfields 72a . . . 72d and the one non-irradiation field 72e are detected and represented by five different intensity values, as shown in FIG. 12(b). The associated mask image resulting from the disclosed method is given in FIG. 12(c). The subsequent image processing algorithms can then be applied to each subfield of the acquired image, leading to an output image with high quality and high diagnostic utility in each subfield. These enhanced subfields are then combined with the mask image, as shown in FIG. 12(d), wherein the frames are used to make the output image more pleasing.

Figure 13:
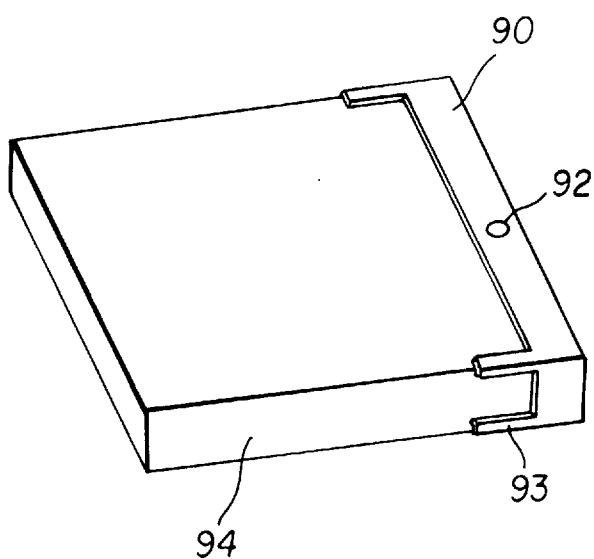
FIG. 13 shows a modification of a collimator shutter to provide a landmark opening.

Although a preferred embodiment of the present invention has been illustrated in the accompanying drawings and described in the foregoing detailed description, it will be understood that the invention is not limited to the embodiment disclosed, but is capable of numerous rearrangements and modifications of parts and elements without departing from the spirit of the invention. For example, instead of modifying a collimator shutter with a small hole to provide a landmark image, it is also possible to add a landmark attachment to an existing collimator. As shown in FIG. 13, an attachment 90 with a hole 92 can be attached (by suitable means, such as slip-on flanges 93) to each existing collimator shutter 94 (only one shown). Furthermore, the invention can be used with regard to any type of application involving radiographic imaging, for example, industrial applications as well as medical applications. In particular, instead of being an anatomical region, the object of interest may be a machine part or a product part subject to inspection, such as an airplane wing.

PARTS LIST 10 image acquisition device
12 input image
14 digital irradiation field processor
16 digital image signal processor
18 image display device
20 output image
30 x-ray tube
32 mirror
34 collimator
36 object
38 object support
40 stimulable phosphor plate
42 slight source
44 electric motor
46 lower set of lead shutters
48 upper set of lead shutters
50 irradiation field
52 body part
54 x-ray exposed region
56 non-irradiation field
58 landmark generation
60 landmark detection
62 irradiation map generation
64 landmark removal
66 modified collimator
68 hole
70a . . . d landmark patterns
72a . . . d irradiation subfields
72e non-irradiation field
80 sequence of blocks
82 non-irradiation mask field
84 open mask field
86 frame
90 attachment
92 hole
93 flange
94 existing collimator shutter

What we claim is:

1. An automated method for detecting an irradiation field in a radiographic image, the irradiation field including an object of interest, said method comprising the steps of:

(a) acquiring a landmarked digital image of the object of interest, said acquired image including an irradiation field bounded by a non-irradiation field and a regularly shaped landmark pattern in said non-irradiation field that is very small in area compared to said irradiation field;

(b) detecting a landmark pattern in the acquired image wherein the landmark pattern includes a plurality of different pattern shapes and/or sizes which identify different exam types; and (c) generating an irradiation map that identifies the location of the irradiation field in relation to the landmark patterns, said irradiation map functioning as a template for further image processing of the radiographic image.

2. The method of claim 1 wherein the object of interest is an anatomical region.

3. The method of claim 1 wherein the step of acquiring a landmarked digital image includes the step of providing the landmark pattern by using a collimator having shutters with holes located near the inner edge centers of the shutters.

4. The method of claim 1 wherein the landmarked digital image is obtained from either of screen/film radiology or digital radiology.

5. The method of claim 1 wherein the step of detecting a landmark pattern includes the use of one or more morphological techniques.

6. The method of claim 1 wherein the step of detecting a landmark pattern includes the recognition of the object of interest.

7. The method of claim 1, wherein the step of generating an irradiation map includes the use of a multiple-valued intensity template for any further image processing to be done on the object of interest where multiple irradiation fields and a non-irradiation field are detected and a different value intensity is assigned to each detected field.

8. The method of claim 1 wherein the radiographic image also includes a non-irradiation filed and the irradiation map is used to generate a mask image for masking the non-irradiation field in an output image generated from the radiographic image.

9. An automated method for detecting an irradiation field including an object of interest in an acquired radiographic image, said method comprising the steps of:

(a) detecting a landmark pattern located in fixed relation to the irradiation field in the acquired image, wherein said acquired image includes an irradiation field surrounded by a non-irradiation field and a regularly shaped landmark pattern in said non-irradiation field that is very small in area compared to said irradiation field, and wherein the landmark pattern includes a plurality of different pattern shapes and/or sizes which identify different exam types; and (b) generating an irradiation map that identifies the location of the irradiation field in relation to the landmark patterns, said irradiation map functioning as a template for further image processing of the radiographic image.

10. The method of claim 9 wherein the object of interest is an anatomical region.

11. The method of claim 9 wherein the step of detecting a landmark pattern includes the use of one or more morphological techniques.

12. The method of claim 11 wherein the landmark pattern includes a plurality of pattern shapes and/or sizes.

13. The method of claim 9 wherein the step of detecting a landmark pattern includes the recognition of the object of interest.

14. The method of claim 9 wherein the step of generating an irradiation map includes the use of a multiple-valued template for any further image processing to be done on the object of interest.

15. An automated method for detecting an irradiation field including an object of interest, comprising the steps of:

(a) acquiring a landmarked digital image of the object of interest, said acquired image including an irradiation field bounded by a non-irradiation field and a regularly shaped landmark pattern in said non-irradiation field that is very small in area compared to said irradiation field;

(b) detecting landmark patterns in the acquired image, wherein the landmark pattern includes a plurality of different pattern shapes and/or sizes which identify different exam types;

(c) generating an irradiation map that identifies the irradiation field and functions as a template for further image processing; and (d) removing the landmark patterns in the acquired image.

16. The method of claim 15 wherein the step of removing landmark patterns includes the use of a smoothing technique.

17. The method of claim 15 wherein the step of removing the landmark patterns includes the use of a curve interpolation technique.

18. An automated method for generating an output image from a radiographic image that includes an irradiation field including an object of interest and a non-irradiation field, said method comprising the steps of:

(a) acquiring a digital image of the object of interest, said acquired image including an irradiation field bounded by a non-irradiation field and a regularly shaped landmark pattern in said non-irradiation field that is very small in area compared to said irradiation field, and wherein the landmark pattern includes a plurality of different pattern shapes and/or sizes which identify different exam types;

(b) detecting the non-irradiation field in the acquired image; and (c) generating a map that identifies the location of the non-irradiation field in relation to the irradiation field, said map functioning as a template for generating a mask image that masks the non-irradiation field in order to make the output image diagnostically useful.

19. The method of claim 18 wherein the generation of a mask image is used to identify regions of interest in the acquired image.

20. The method of claim 18 wherein the generation of a mask image is used to reduce flare effect from a display device.

21. The method of claim 18 wherein the mask image has a preselected density and texture.

22. The method of claim 18 wherein the generation of a mask image further includes generating a frame to distinguish the non-irradiation field being masked and the direct x-ray exposed irradiation regions of the acquired image.

23. The method of claim 22 wherein the frame is of any shape and size depending on its specific application.

24. An apparatus for detecting an irradiation field, comprising:

(a) means for acquiring a landmarked digital image of the object of interest, said acquired image including an irradiation field bounded by a non-irradiation field and a regularly shaped landmark pattern in said non-irradiation field that is very small in area compared to said irradiation field, and wherein the landmark pattern includes a plurality of different pattern shapes and/or sizes which identify different exam types;

(b) means for detecting landmark patterns in the acquired image; and (c) means for generating an irradiation map that identifies the irradiation field and functions as a template for further image processing.

25. Apparatus as claimed in claim 24 further including means for generating a mask image from the acquired digital image to make the output image diagnostically useful.

26. An apparatus for detecting an irradiation field, comprising:

(a) means for acquiring a landmarked digital image of the object of interest, said acquired image including an irradiation field bounded by a non-irradiation field and a regularly shaped landmark pattern in said non-irradiation field that is very small in area compared to said irradiation field, wherein the landmark pattern includes a plurality of different pattern shapes and/or sizes which identify different exam types;

(b) means for detecting landmark patterns in the acquired image;

(c) means for generating an irradiation map that identifies the irradiation field and functions as a template for further image processing; and (d) means for removing landmark patterns in the acquired image.

27. Apparatus for generating an output image from a radiographic image that includes an irradiation field including an object of interest and a non-irradiation field, said method comprising:

(a) means for acquiring a digital image of the object of interest, said acquired image including an irradiation field bounded by a non-irradiation field and a regularly shaped landmark pattern in said non-irradiation field that is very small in area compared to said irradiation field, and wherein the landmark pattern includes a plurality of different pattern shapes and/or sizes which identify different exam types;

(b) means for detecting the non-irradiation field in the acquired image; and (c) means for generating an map that identifies the location of the non-irradiation field in relation to the irradiation field, said map functioning as a template for generating a mask image that masks the non-irradiation field in order to make the output image diagnostically useful.

* * * * *